(12) United States Patent
Dettinger et al.

(10) Patent No.: US 8,442,992 B2
(45) Date of Patent: *May 14, 2013

(54) MIXED MODE (MECHANICAL PROCESS AND ENGLISH TEXT) QUERY BUILDING SUPPORT FOR IMPROVING THE PROCESS OF BUILDING QUERIES CORRECTLY

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,784

(22) Filed: Jun. 28, 2012

(65) Prior Publication Data

US 2012/0265777 A1    Oct. 18, 2012

Related U.S. Application Data

(63) Continuation of application No. 11/266,739, filed on Nov. 3, 2005, now Pat. No. 8,214,383.

(51) Int. Cl.
*G06F 17/30* (2006.01)

(52) U.S. Cl.
USPC .......................................................... 707/766

(58) Field of Classification Search ................... 707/766
See application file for complete search history.

(56) References Cited

U.S. PATENT DOCUMENTS

| | | | |
|---|---|---|---|
| 5,175,814 A | 12/1992 | Anick et al. |
| 5,924,089 A | 7/1999 | Mocek et al. |
| 5,963,940 A | 10/1999 | Liddy et al. |
| 6,460,029 B1 | 10/2002 | Fries et al. |
| 6,725,227 B1 | 4/2004 | Li |
| 2001/0049697 A1 | 12/2001 | Johndrew et al. |
| 2007/0100809 A1 | 5/2007 | Dettinger et al. |

*Primary Examiner* — Amresh Singh
(74) *Attorney, Agent, or Firm* — Patterson & Sheridan LLP

(57) ABSTRACT

Embodiments of the present invention allow verification of query language by providing a natural language description for the query language. A natural language description is generated for each query component along with selectable text representing the query component. Upon selection of the selectable text, the query component is rendered for editing.

16 Claims, 8 Drawing Sheets

```
Output: Clinic Number, Last Name,
Address

Age > 50 and (Hemoglobin Test > 15 or Hemoglobin
Test 2 > 150)

and Diagnosis = Type II Diabetes
```

QUERY LANGUAGE

```
Create a list containing Patients.
This list will have the clinic number, last name,
first name, and address of these patients.
This list will not be sorted in any particular order.
This list will only contain information for patients
that are over 50 years of age.                      ← 601
This list will only contain information for patients
that have at least one of
      -a hemoglobin test score above 15
      -a hemoglobin Test 2 score above 150
This list will only contain information for patients
that have been diagnosed with Type II Diabetes
```

NATURAL LANGUAGE DOCUMENT

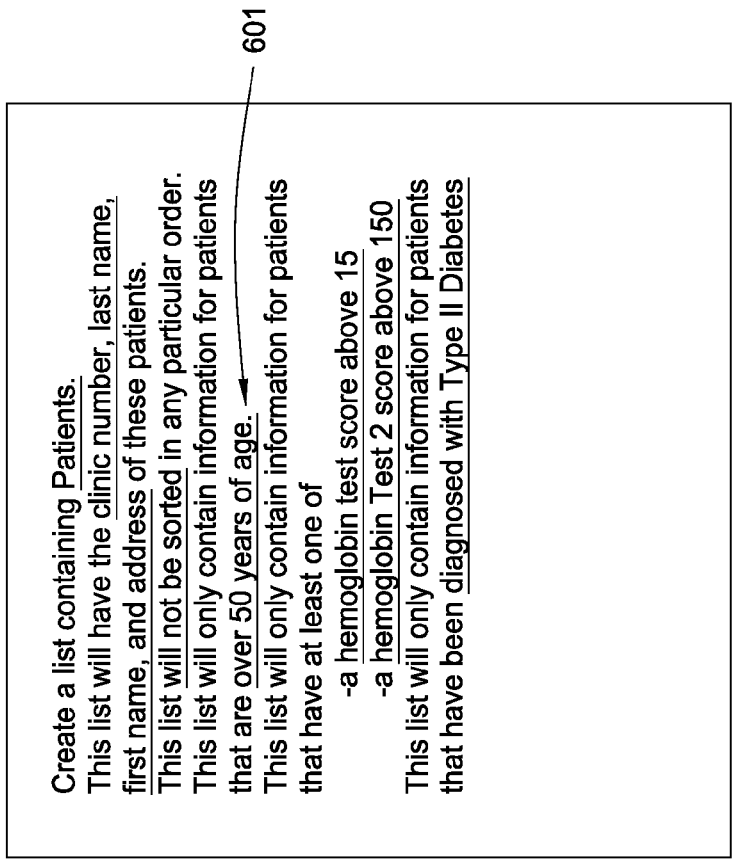
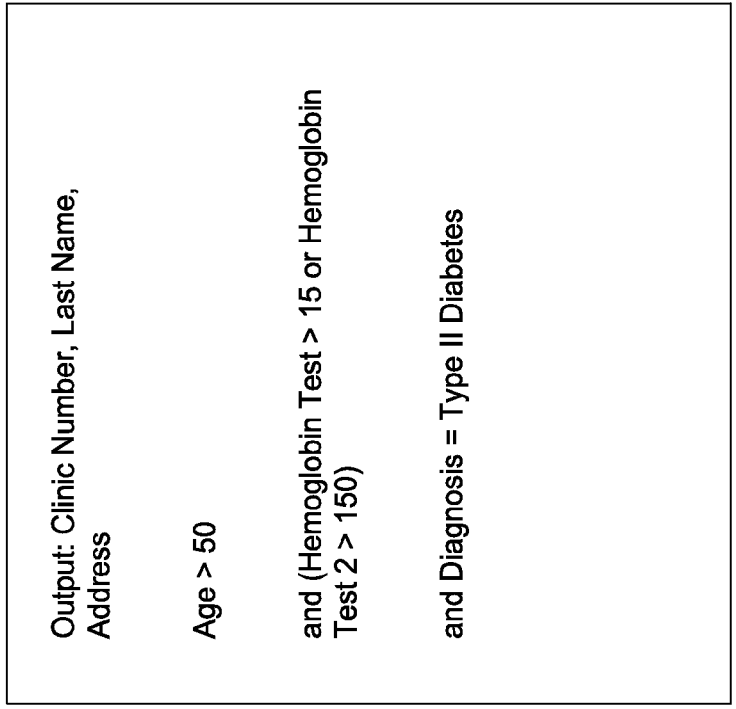
FIG. 6

Create a list containing Patients.
This list will have the clinic number, last name, first name, and address of these patients.
This list will not be sorted in any particular order.
This list will only contain information for patients that are over 50 years of age.
This list will only contain information for patients that are over 50 years of age.

| | |
|---|---|
| This list will | greater than or equal to 50 years of age |
| least one of | less that 50 years of age |
| | lesser than or equal to 50 years of age |
| -a hemo | equal to 50 years of age |
| -a hemo | not equal to 50 years of age | nts that have at

This list will only contain information for patients that have been diagnosed with Type II Diabetes

FIG. 7

MIXED MODE (MECHANICAL PROCESS AND ENGLISH TEXT) QUERY BUILDING SUPPORT FOR IMPROVING THE PROCESS OF BUILDING QUERIES CORRECTLY

CROSS-REFERENCE TO RELATED APPLICATIONS

This application is a continuation of co-pending U.S. patent application Ser. No. 11/266,739, filed Nov. 3, 2005. The aforementioned related patent application is herein incorporated by reference in its entirety.

BACKGROUND OF THE INVENTION

1. Field of the Invention

The present invention is generally related to data processing and more specifically to verifying queries to databases.

2. Description of the Related Art

Querying a database to retrieve information may be a critical function for most businesses. A database may contain information collected and processed by a business over time. Such information may provide the business with critical data to aid decision making, planning, program implementation, control, etc. The ability to quickly and efficiently retrieve such critical data may provide a business with a competitive advantage in its respective market. For example, critical data collected and processed over time may indicate a shift in consumer expectations related to products or services provided by the business. By adjusting its products and services to the changing consumer expectations, the business may become more profitable.

With the growing complexity of databases, the complexity of query language to retrieve data in the databases has also greatly increased. Furthermore, due to the increasing dependency and frequency of accesses to organizational databases, more and more members of the organization may be required to build such complex queries even though they may not necessarily be trained in query languages. One way to allow a person not trained in query languages to build a query would be to provide a graphical user interface to build the query, the selections in the graphical user interface being used to generate the query.

However, in some organizations that maintain large complex databases, the GUIs used to create queries may also become complex. Therefore, even GUI created queries may have to be verified. One way to verify a query is by trial and error. However, this solution may be inefficient and cost prohibitive because writing many different queries may become very expensive. Therefore, it is essential that the queries are written correctly and accurately to minimize the number of iterations of query writing to achieve the desired results from the query. This may be a problem for lay users who may not have the skills necessary to verify query language.

Therefore, what is needed is a method and system for allowing lay users to verify complex queries.

SUMMARY OF THE INVENTION

Embodiments of the present invention provide computer-implemented methods, computers and tangible computer readable storage media for verifying queries.

One embodiment of the invention provides a computer implemented method for verifying query logic. The method generally includes receiving user input corresponding to a query language wherein the input defines a plurality of query components for a query being composed by a user, generating, for each query component, a natural language description for the query component, receiving selections of portions of the natural language description, and in response to each selection, identifying for the user, an associated query component corresponding to the to the selected natural language description.

Another embodiment of the invention provides a tangible computer readable storage medium containing a program which, when executed, performs operations for verifying query logic. The operations generally include generating a natural language description for a plurality query components in response to receiving user input corresponding to a query language, the input defining the plurality of query components, and in response to receiving selections of portions of the natural language description, identifying, for the user, an associated query component corresponding to the selected natural language description.

Yet another embodiment of the invention provides a computer comprising a memory containing at least one application and a processor communicably connected to the memory. The processor, when executing the application is configured to receive user input corresponding to a query language wherein the input defines a plurality of query components for a query being composed by a user, generate, for each query component, a natural language description for the query component, receive selections of portions of the natural language description and in response to each selection, identify, for the user, an associated query component corresponding to the to the selected natural language description.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 illustrates a natural language document according to one embodiment of the invention.

FIG. 7 illustrates a natural language document providing a drop down list for editing the natural language of a query to edit the query.

DETAILED DESCRIPTION OF THE PREFERRED EMBODIMENTS

Figure 1:
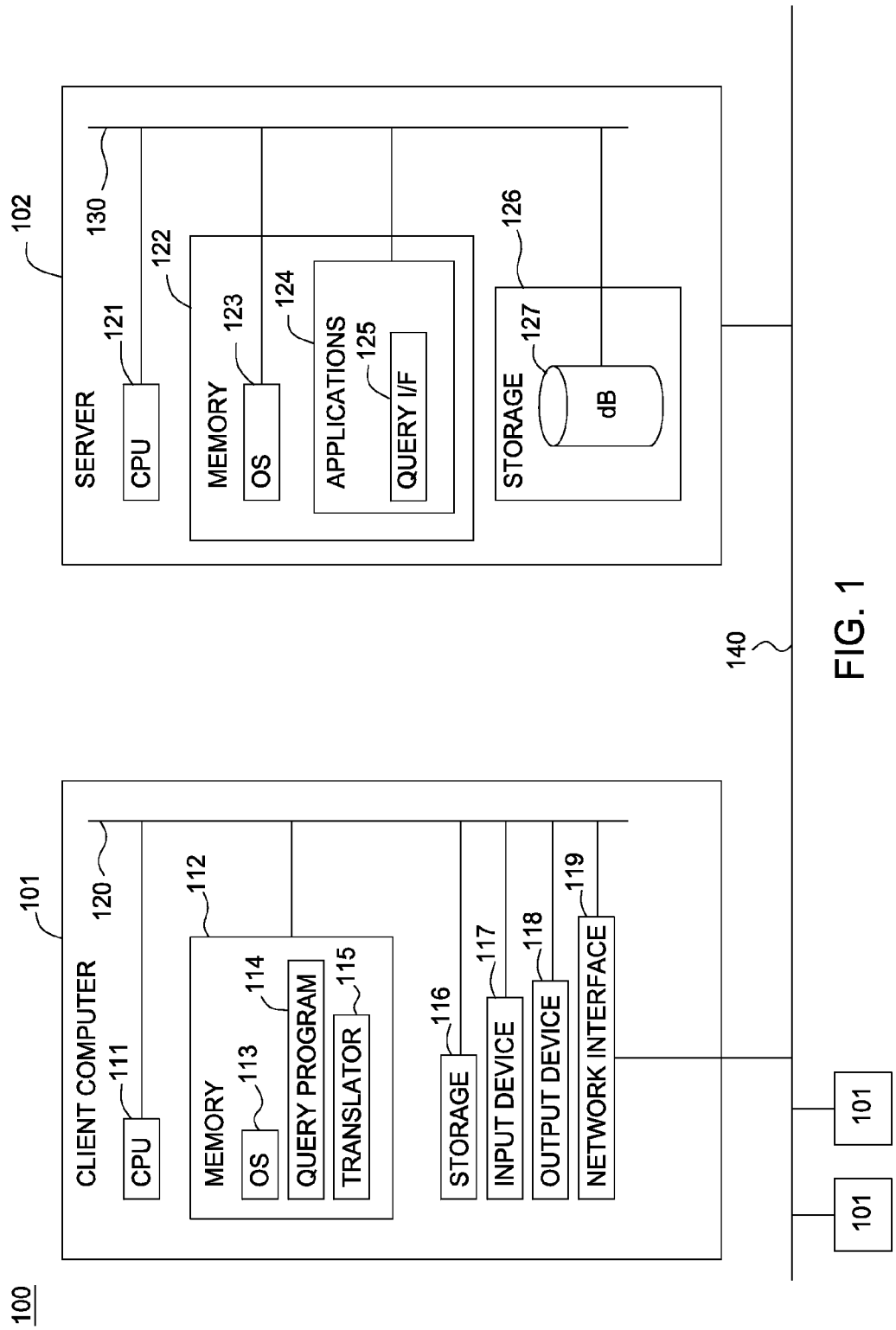
FIG. 1 is a computer system illustratively utilized in accordance with this invention.

Embodiments of the present invention allow verification of query language by providing a natural language description for the query language. A natural language description is generated for each query component along with selectable text representing the query component. Upon selection of the selectable text, the query component is rendered for editing.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 113. Illustrative operating systems, which may be used to advantage, include Linux and Microsoft's Windows®. More generally, any operating system supporting the functions disclosed herein may be used.

The memory 112 is also shown containing a query program 114 that, when executed by CPU 111, provides support for querying a server 102. In one embodiment, the query program 114 includes a web-based Graphical User Interface (GUI), which allows the user to display Hyper Text Markup Language (HTML) information. More generally, however, the query program may be a GUI-based program capable of rendering the information transferred between the client computer 102 and the server 102.

The memory may also contain a translator program 115 that, when read and executed by CPU 111 in the client computer 101, cause the computer system 100 to perform the steps necessary to execute steps or elements embodying the various aspects of the invention. More specifically, translator program 115 provides for translating queries into natural language for verification and editing.

The server 102 may by physically arranged in a manner similar to the client computer 101. Accordingly, the server 102 is shown generally comprising a CPU 121, a memory 122, and a storage device 126, coupled to one another by a bus 130. Memory 122 may be a random access memory sufficiently large to hold the necessary programming and data structures that are located on the server 102.

The server 102 is generally under the control of an operating system 123 shown residing in memory 122. Examples of the operating system 123 include IBM OS/400®, UNIX, Microsoft Windows®, and the like. More generally, any operating system capable of supporting the functions described herein may be used.

The memory 122 further includes one or more applications 124. Applications 124 may include a query interface 125. The applications 124 are software products comprising a plurality of instructions that are resident at various times in various memory and storage devices in the computer system 100. For example, applications 124 may contain a query interface 125. The query interface 125 (and more generally, any requesting entity, including the operating system 123) is configured to issue queries against a database 127 (shown in storage 126). The database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Query Building

For purposes of the present description it will be helpful to define some terms. As is evident from the above description, to perform a search for a set of desired database records within database 127, a requesting entity (e.g., query program 114) builds a query by combining one or more "operands" and "logic operators" to form conditions of a search expression. The operands and operators together identify the desired search. Illustrative operators include arithmetic operators including comparison operators such as, >, <, = . . . For instance, in the condition "(Age='50')", "Age" is an operand which is related to a value (50—also an operand) by an "equal to" operator (=). This condition represents a request for search results in which the "Age" operator (a field in a database) is equal to a value of 50 years. Another illustrative condition is "(Age>'50')" which represents a request for search results in which the "Age" operand has a value greater than 50 years. In addition to arithmetic operators, two or more operands can be related by a logic operator representing a logical relationship between operands. Logic operators are logical connectors, such as logical AND, OR, and NOT. Each operand, or operand with a operator (arithmetic or logical), defines a single search criterion.

For purposes of the present description, a search expression may defined using "simple conditions" or "complex conditions". A simple condition is defined by a pair of operands related by an operator. A complex (or compound) condition is defined by relating two or more conditions with an operator. An example of a simple condition is "A>B". An example of a complex condition is ((A>B) AND (C=D)). A simple condition or complex condition may make up a portion of a search expression (i.e., a query).

In one embodiment of the invention, database 127 may be a hospital database containing medical information related to the patients that have visited the hospital. Queries may be created to retrieve information about specific patients meeting a given criteria. For example, a query may be written to retrieve data for patients who were diagnosed with Type II diabetes when they were in their thirties. The hospital may want to further narrow the list of patients based on other clinical criteria such as hemoglobin tests and current patient age. Such a query may be written as follows Output: Clinic Number, Last Name, First Name, Address
Age>50
and (Hemoglobin Test>15 or Hemoglobin Test 2>150)
and Diagnosis=Type II Diabetes The first line of the query lists the data to be displayed in the results for patients meeting the criteria of the query. In the foregoing query, the number of the clinic the patient visited, patient's last name, first name, and address will be listed in the results of the query. The second line of the query includes a condition based on the patient's age. Therefore, only those patients that are currently older than 50 years will be included in the results. The second line of the query includes a condition based on the results of Hemoglobin tests conducted on the patients. The condition requires that only those patients with a Hemoglobin Test value greater than 15 or a Hemoglobin Test 2 value greater than 150 be displayed in the results.

Figure 2:
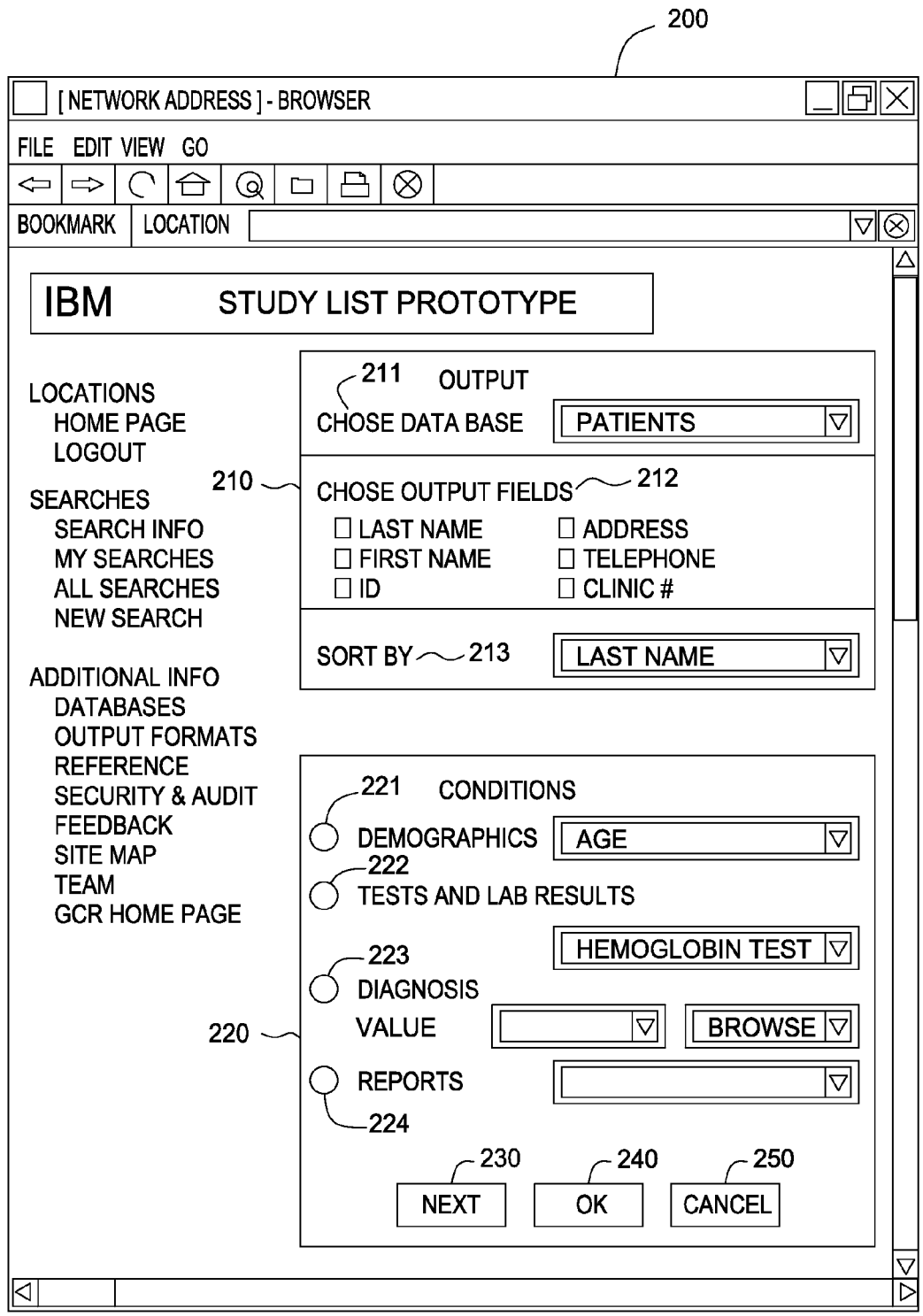
FIG. 2 is a Graphical User Interface (GUI) screen for building a query for a hospital database according to one embodiment of the invention.
Figure 3:
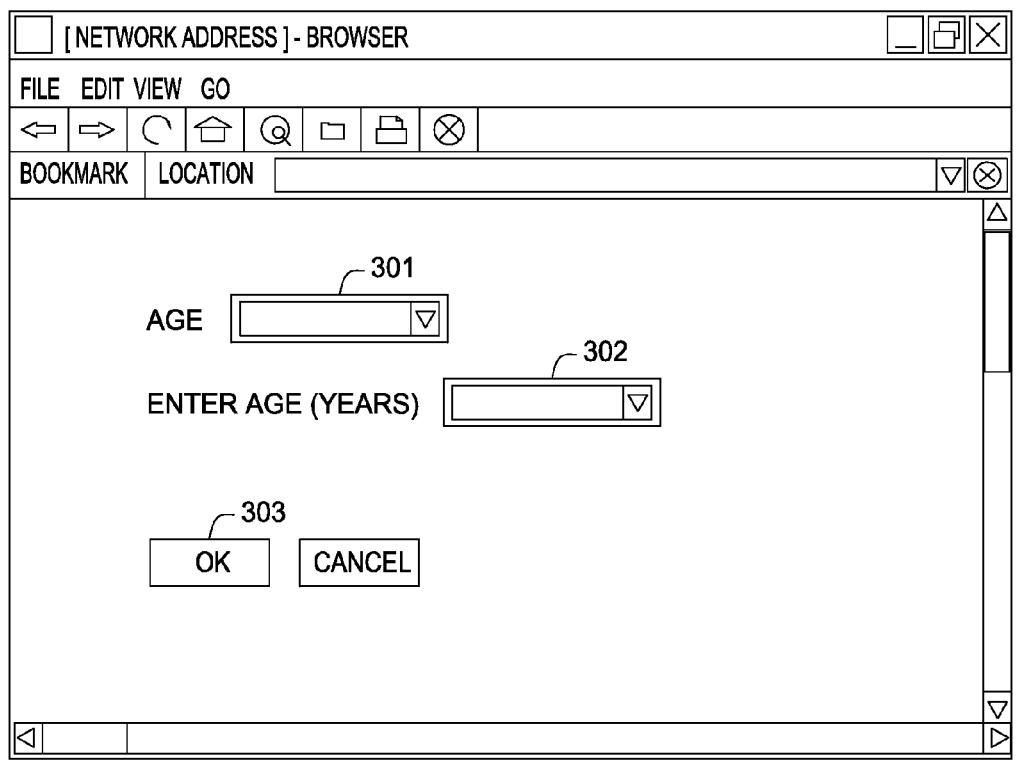
FIG. 3 is a GUI for adding age as a condition to a query.
Figure 4:
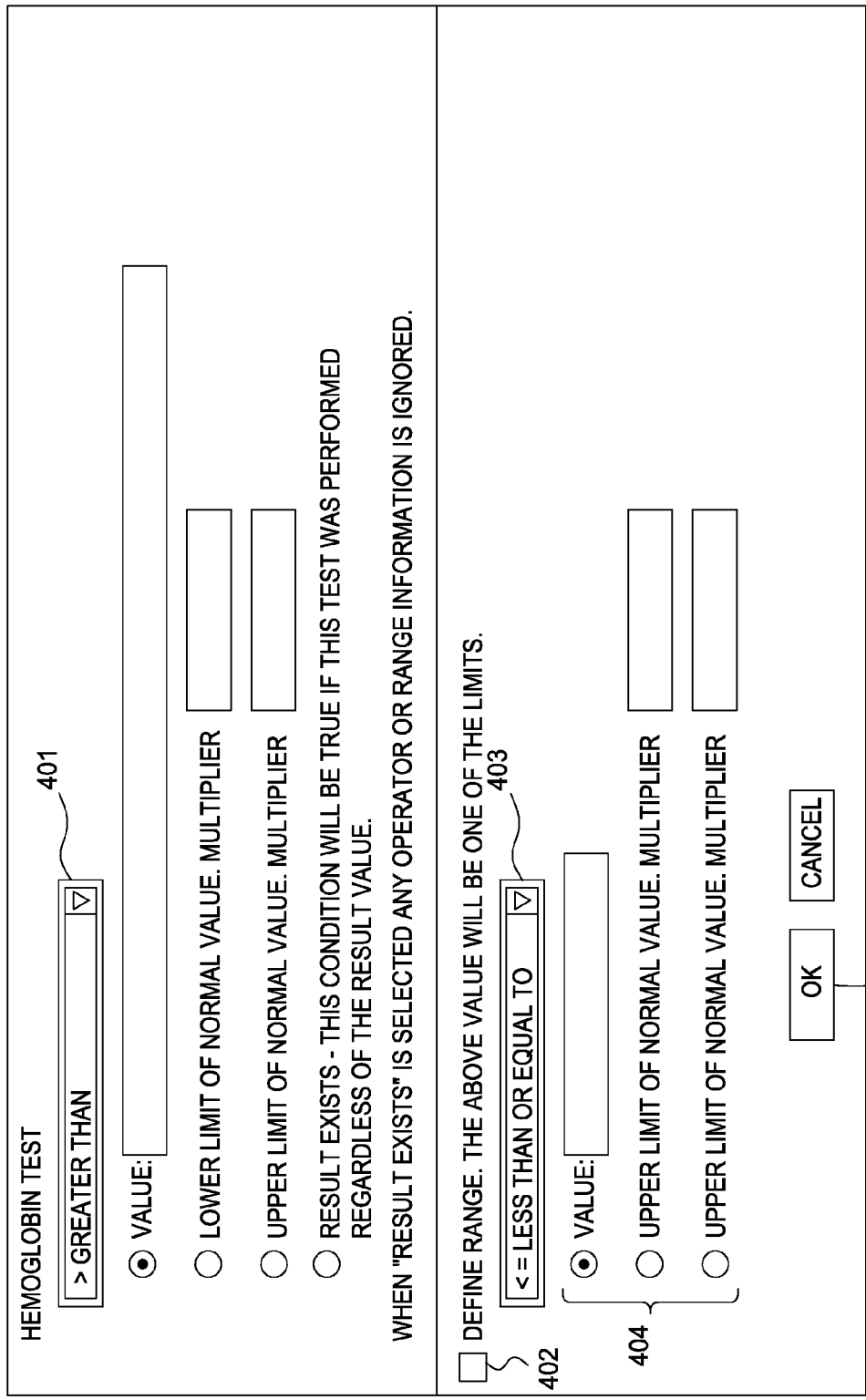
FIG. 4 is a GUI for adding Hemoglobin Test values as conditions in a query.

In one embodiment of the invention, queries, such as the foregoing query, may be directly composed by a person skilled in query languages. However, one skilled in the art will recognize that a query may be built by providing a Graphical User Interface (GUI) containing output criteria and conditions to be included in the query. FIGS. 2-4 illustrate GUI screens that may be used to compose the above-mentioned query. The figures are specific to accessing medical data. However, embodiments of the invention may also be used to advantage with any type of information including, for example, financial information, employment information, etc.

In general, the GUIs shown in FIGS. 2-4 allow a user to build queries comprising conditions added by the user in the GUIs. Recall that, as defined herein, a simple condition is a comparison operation. An illustrative simple condition is (Age='50'). Thus, adding a simple condition to a query generally involves allowing the user to select operands and a comparison operator (e.g., >, <, =). In one embodiment, when a user initially invokes the query program 114, HTML content in the form of a first GUI 200 is rendered (shown in FIG. 2.) GUI 200, shown in FIG. 2, may be the first of a series of screens which a user uses to add a condition to a query. In general, the GUI 200 includes a plurality of output categories 210 and a plurality of condition categories 220. Output categories 210 may contain a choice of database 211 to select a database containing a particular type of persons related to the hospital. For example, the user may choose, in a drop down box, the patients' database, doctors' database, staff database etc.

Output categories 210 may also contain a list of output fields that a user may select. The results of the query may present information in the selected fields when the query is run. Output field selection may be performed by clicking check boxes associated with a listed field. For example, in FIG. 2, checkboxes are provided for selecting Last Name, First Name, Identification number (ID), Address, Telephone number, and Clinic number. While check boxes are described herein, one skilled in the art will recognize that any reasonable means for selecting the output fields, such as a drop down boxes, text boxes, etc may be used.

Output categories 110 may contain a sort drop down box to select a reference field for sorting. Output fields 212 may be provided in the dropdown box. In some embodiments the fields reflected in the sort box 213 may be dynamically updated to reflect only those fields selected by the user. For simplicity, FIG. 2 illustrates the selection of only one field for sorting. However, one skilled in the art will recognize that results may be provided using different sorting criteria for multiple fields. Therefore, GUI 200 may include appropriate GUI elements to receive input related to such multiple fields and sorting criteria.

GUI 200 may also contain a plurality of condition categories 220, each category having an associated radio button that the user may select. The condition categories shown include "demographics" 221, "Tests and Lab Results" 222, "Diagnosis" 223 and "Reports" 224. As illustrated, each field has an associated field into which a value may be selected or input. Some fields are drop down menu's while some may be text boxes. In the latter case, the fields may have associated browse buttons to facilitate user selection of valid values.

Once the condition categories and values have been selected, the user clicks on the Next button 230. Clicking the Next button 230 causes the GUI to render the next appropriate interface necessary to continue the process of adding a condition. In this manner, the user may be presented with a series of graphical user interfaces necessary to add a condition. By way of example, assume that the user has selected the demographic condition category 221 and the "Age" value from the drop-down menu. Upon pressing the Next button 230, the user is presented with a second GUI 300 shown in FIG. 3. GUI 300 comprises a comparison operator drop-down menu 301 from which a user may select a comparison operator (e.g., >, <, =) and an age field 302 into which a user may input a value for the age. The process of adding the age condition is completed when the user clicks on the OK button 303.

Similarly, if the user had selected Hemoglobin Test in the Tests and Lab Results dropdown 222 GUI 400 (FIG. 4) may be displayed to input desired search criteria for the selected test. The upper portion of the GUI 400 includes a drop-down menu 401 from which to select a comparison operator and a plurality of regular buttons (illustratively for) for defining a value. The user may search on a range of values for the selected test by checking the Range checkbox 402. The user must then specifying a comparison operator from the drop-down menu 403 and an associated value by selecting one of the radio buttons is 404. Once the search criteria for GUI 400 have been entered the user may press the OK button 405.

Figure 5:
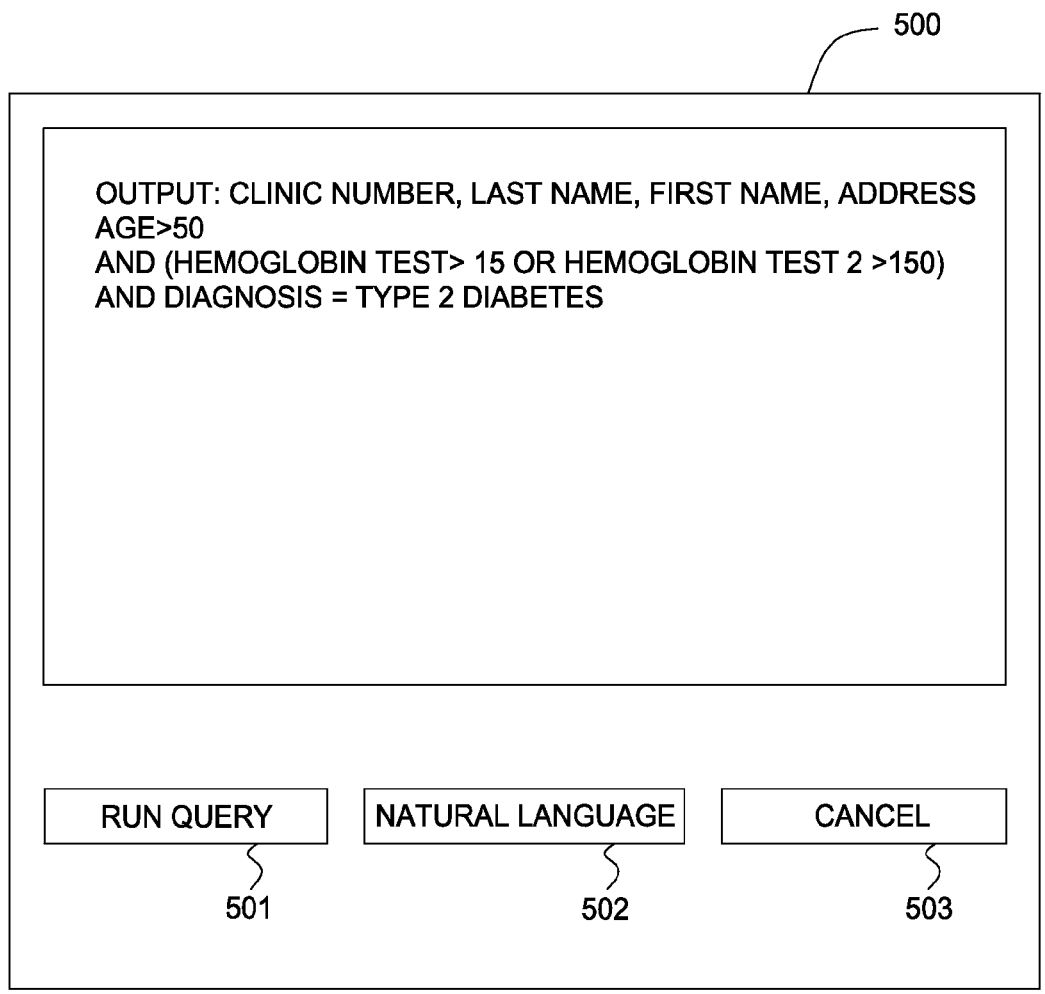
FIG. 5 is a GUI containing editable query language created using other GUIs.

After the search criteria for each of the selected condition criteria 220 have been entered, the user may click OK Button 240 to view the query language for the query. The query language may be displayed in an editable text screen 500 as illustrated in FIG. 5. The user may verify the query language in text screen 500 and click Run Query Button 501 to run the query. Alternatively, the user may verify the query by clicking the Natural Language Button 502 to view a natural language description of the query.

Query Verification

If the user clicks the Natural Language Button 502, a document containing the natural language description of the query may be displayed. The natural language consists of language expressed using normal spoken-language syntax such as the language that would be used to make a spoken or written description of the query to another person. A user viewing the natural language can easily comprehend and verify the query because there is no need to learn the syntax rules or conventions, which is required to verify query language.

While the above descriptions illustrate a method of viewing the natural language description of the query after the query has been built, embodiments of the invention are not restricted to this limitation. The natural language for the query may be generated dynamically as each query component is added. In this instance the user may be provided with two concurrently and adjacently displayed screens. One screen, for example, may be used for creating the query, and the other screen may display the natural language for the query as the query is being built. Therefore, a user may be allowed to perform verification steps during the query building process rather than after the process.

FIG. 6 illustrates an exemplary natural language document that may be generated for the exemplary hospital query described above. A user may read the natural language document to verify that the logic of the query conforms with the intended logic. For example, if the user had mistakenly selected the wrong comparison operator for the age condition, the natural language description would reveal the error. As an illustration, if the user had mistakenly chosen the ">" comparison operator believing it to mean "lesser than" instead of "greater than", the natural language, as indicated in FIG. 6 would reveal the mistake.

Furthermore, each output and condition described in the natural language contains a hyperlink that may be clicked by the user to edit the query. In this example the hyperlinks are indicated by underlining. One skilled in the art will realize, however, that any other means such as highlighting or a distinct colored text may be used to indicate a hyperlink.

Clicking the hyperlink may allow the user to edit the query. In one embodiment of the invention, clicking the hyperlink will render the editable query language GUI 500, with the query condition or output associated with the clicked natural language link being selected for editing. For example, if the user clicks the "over 50 years of age" link 601, GUI 500 illustrated in FIG. 5 may be displayed with the "Age>50" condition highlighted and the cursor at or near the highlighting. The query may then be edited by directly making amendments to the conditions in the query language. For example, the user may delete the ">" comparison operator and replace it with the "<" operator to change the condition from "greater than" to "lesser than", as may have been originally intended.

In some embodiments of the invention, clicking the hyperlink may provide a dropdown menu with a list of natural language choices to replace the current text. For example, clicking the "over 50 years of age" link may display a list of selectable replacement text, as illustrated in FIG. 7. Such a replacement text list may include "greater than or equal to 50 years of age", "less than 50 years of age", "less than or equal to 50 years of age", "equal to 50 years of age", "not equal to 50 years of age", etc., as illustrated. In response to the selection of replacement text, the "age>50" component in the query language may be updated with a new comparison operator according to the updated text.

In other embodiments of the invention, upon clicking a hyperlink, one of GUIs 200-400 may be displayed depending on the condition clicked. For example, if the user had mistakenly checked Clinic Number in output fields 212 of GUI 200 instead of the Identification number, the user may click the "clinic number, last name, first name, and address" link. Clicking this link may render GUI 200 along with the users previous selections. Furthermore, the output fields 212 may be highlighted to direct the user's attention to the area in the GUI to be edited. The user may make modifications in the GUI and click OK Button 240 to update the query language. GUI 300 or 400 may similarly be displayed for editing depending on the natural language link clicked.

In some embodiments of the invention, GUI panel 500 and the natural language document in FIG. 6 may be simultaneously displayed in a first and second panel of the same GUI. In such embodiments, the query language may be displayed in the first panel and the natural language description displayed in the second panel. Edits made in the first may be automatically reflected in the second panel as the edits are made. In yet another embodiment, the second panel may also be editable, the changes in the second panel being automatically reflected in the first panel.

Figure 8:
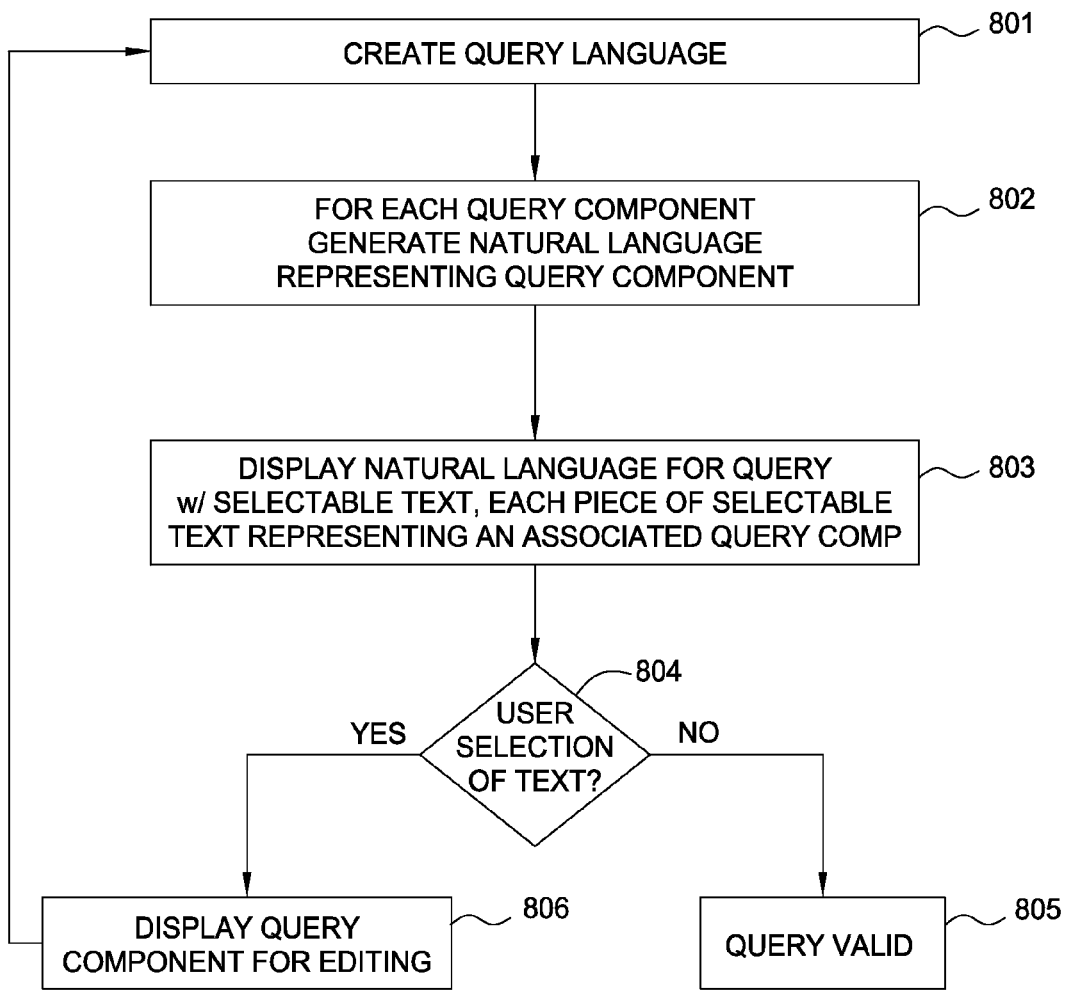
FIG. 8 is a flow diagram of exemplary operation performed for query verification according to one embodiment of the invention.

FIG. 8 is a flow diagram of exemplary operations according to an embodiment of the present invention performed to verify queries. The operations begin in step 801 by creating the query language. As described above, the query language may be created directly or by the use of a GUI. In step 802, for each component of the query, natural language describing the query component is generated. The natural language description for the query may be provided by displaying the natural language description of each query component in step 803. The natural language description of the query may contain selectable text, each piece of selectable text corresponding to the query component for which it was generated. In step 804, a user selection may be provided to select a piece of selectable text that the user may wish to edit. If no user selection is made, the query is deemed valid in step 805. On the other hand, if a user selection is received, the query component associated with the selectable text is displayed for editing in step 806. Upon completion of editing, the query language may be regenerated and the verification process repeated, as illustrated.

CONCLUSION

By allowing a query to be verified by providing a natural language description of the query, the natural language containing selectable text to display query components associated with the selected text, embodiments of the present invention facilitate a more efficient query building process.

While the foregoing is directed to embodiments of the present invention, other and further embodiments of the invention may be devised without departing from the basic scope thereof, and the scope thereof is determined by the claims that follow.

What is claimed is:

1. A computer-readable storage medium storing instructions, which, when executed on a processor, perform an operation for verifying query logic, the operation comprising:
    receiving a first user input corresponding to a query language, the first input defining a plurality of query components for a query being composed by a user;
    for each query component, generating a natural language description for the query component, wherein each respective natural language description provides a statement of an action performed by the query component when the query is executed;
    receiving a second user input, wherein the second user input modifies a portion of the natural language description; and
    in response to the modified portion of the natural language description, modifying the query component corresponding to the modified portion to provide a modified query, which when executed, performs an action specified by the modified natural language statement.

2. The computer-readable storage medium of claim 1, wherein the operation further comprises:
    receiving a drop down selection upon receiving a selection of a particular portion of the natural language description, the drop down selection containing alternative natural language descriptions for the particular portion; and
    selecting an alternative natural language description from the drop down selection, the selection being configured to modify the corresponding query component corresponding to the particular portion to reflect the selection.

3. The computer-readable storage medium of claim 1, wherein the natural language description contains hyperlinks connecting the portions of the natural language description to respective associated query components and wherein receiving selections of portions of the natural language description comprises receiving selections of the hyperlinks and further comprising:
    responsive to receiving a selection of a given hyperlink for a given portion of the natural language description, navigating the user to the respective associated query component of the given portion.

4. The computer-readable storage medium of claim 1, wherein the plurality of query components are selected from one of a conditional statement and an output statement.

5. The computer-readable storage medium of claim 1, wherein the natural language description for each component is generated in real time as each corresponding query component is defined.

6. The computer-readable storage medium of claim 1, wherein the operation further comprises:
    displaying the plurality of query components of the query in a first panel of a graphical user interface; and
    simultaneously displaying the natural language description in a second panel of the graphical user interface.

7. The computer-readable storage medium of claim 6, wherein both the first and second panels are editable and making edits to either panel results in corresponding changes to be automatically reflected in the other panel.

8. The computer-readable storage medium of claim 1, wherein receiving user input comprises:
    receiving selections in one or more screens of a graphical user interface, the screens comprising one or more query components, wherein the selections define the one or more query components; and
    in response to the selections, generating the query language.

9. A system, comprising:
    a processor; and
    a memory, wherein the memory includes an application program configured to perform an operation for verifying query logic, the operation comprising:
        receiving a first user input corresponding to a query language, the first input defining a plurality of query components for a query being composed by a user,
        for each query component, generating a natural language description for the query component, wherein each respective natural language description provides a statement of an action performed by the query component when the query is executed,
        receiving a second user input, wherein the second user input modifies a portion of the natural language description, and
        in response to the modified portion of the natural language description, modifying the query component corresponding to the modified portion to provide a modified query, which when executed, performs an action specified by the modified natural language statement.

10. The system of claim 9, wherein the operation further comprises:
    receiving a drop down selection upon receiving a selection of a particular portion of the natural language description, the drop down selection containing alternative natural language descriptions for the particular portion; and selecting an alternative natural language description from the drop down selection, the selection being configured to modify the corresponding query component corresponding to the particular portion to reflect the selection.

11. The system of claim 9, wherein the natural language description contains hyperlinks connecting the portions of the natural language description to respective associated query components and wherein receiving selections of portions of the natural language description comprises receiving selections of the hyperlinks and further comprising:

responsive to receiving a selection of a given hyperlink for a given portion of the natural language description, navigating the user to the respective associated query component of the given portion.

12. The system of claim 9, wherein the plurality of query components are selected from one of a conditional statement and an output statement.

13. The system of claim 9, wherein the natural language description for each component is generated in real time as each corresponding query component is defined.

14. The system of claim 9, wherein the operation further comprises:

displaying the plurality of query components of the query in a first panel of a graphical user interface; and simultaneously displaying the natural language description in a second panel of the graphical user interface.

15. The system of claim 14, wherein both the first and second panels are editable and making edits to either panel results in corresponding changes to be automatically reflected in the other panel.

16. The system of claim 9, wherein receiving user input comprises:

receiving selections in one or more screens of a graphical user interface, the screens comprising one or more query components, wherein the selections define the one or more query components; and in response to the selections, generating the query language.

\* \* \* \* \*